(12) United States Patent
Lee et al.

(10) Patent No.: US 10,274,361 B2
(45) Date of Patent: Apr. 30, 2019

(54) DEVICE FOR WEIGHT MEASUREMENT OF A MOVEABLE ARTICLE

(71) Applicants: Sung Moo Lee, Seoul (KR); Kil Moo Lee, Yongin-si (KR)

(72) Inventors: Sung Moo Lee, Seoul (KR); Kil Moo Lee, Yongin-si (KR)

(*) Notice: Subject to any disclaimer, the term of this patent is extended or adjusted under 35 U.S.C. 154(b) by 89 days.

(21) Appl. No.: 15/329,682

(22) PCT Filed: Jul. 2, 2015

(86) PCT No.: PCT/KR2015/006801
§ 371 (c)(1),
(2) Date: Jan. 27, 2017

(87) PCT Pub. No.: WO2016/017942
PCT Pub. Date: Feb. 4, 2016

(65) Prior Publication Data
US 2017/0219417 A1 Aug. 3, 2017

(30) Foreign Application Priority Data
Jul. 31, 2014 (KR) .................. 10-2014-0098060

(51) Int. Cl.
| | |
|---|---|
| *G01G 19/52* | (2006.01) |
| *G01G 19/02* | (2006.01) |
| *G01G 3/00* | (2006.01) |
| *G01G 19/08* | (2006.01) |
| *G01G 23/18* | (2006.01) |

(52) U.S. Cl.
CPC .............. *G01G 19/52* (2013.01); *G01G 3/00* (2013.01); *G01G 19/02* (2013.01); *G01G 19/08* (2013.01); *G01G 23/18* (2013.01)

(58) Field of Classification Search
CPC ......... G01G 19/52; G01G 3/00; G01G 19/02; G01G 19/08; G01G 23/18
USPC ................................. 177/245, 254
See application file for complete search history.

(56) References Cited

U.S. PATENT DOCUMENTS

| | | | |
|---|---|---|---|
| 2007/0205025 A1* | 9/2007 | Taha ............... | A45C 3/00 177/245 |
| 2014/0060942 A1 | 3/2014 | Qu | |
| 2015/0160069 A1* | 6/2015 | Kellis ............ | G01G 19/58 177/127 |

FOREIGN PATENT DOCUMENTS

| | | | | |
|---|---|---|---|---|
| EP | 1116891 A1 * | 7/2001 | ............ | B23P 19/062 |
| JP | 2001-091349 A | 6/2001 | | |
| KR | 2003-0084096 A | 11/2003 | | |

(Continued)

*Primary Examiner* — Natalie Huls
*Assistant Examiner* — Monica S Young
(74) *Attorney, Agent, or Firm* — Maschoff Brennan

(57) ABSTRACT

An embodiment of the present invention relates to a weight measurement system capable of conveniently measuring the weight of an object being measured in real time. Particularly, in the present embodiment, a weight measurement device is formed as a structure arranged between the object being measured and a wheel. The weight measurement device comprises: an upper frame provided at the bottom of the object being measured; a lower frame provided at the top of the wheel; an elastic transformable body of which one end is connected to the upper frame and of which the other end is connected to the lower frame; and a transformation amount sensor provided to the elastic transformable body so as to sense the transformation amount of the elastic transformable body.

11 Claims, 6 Drawing Sheets

(56) References Cited

FOREIGN PATENT DOCUMENTS

| | | | |
|---|---|---|---|
| KR | 10-2004-0089356 A | 4/2005 | |
| KR | 10-1006692 B1 | 1/2011 | |
| WO | WO 2014008547 A1 * | 1/2014 | ............ G01G 19/58 |

* cited by examiner

【Fig 1】
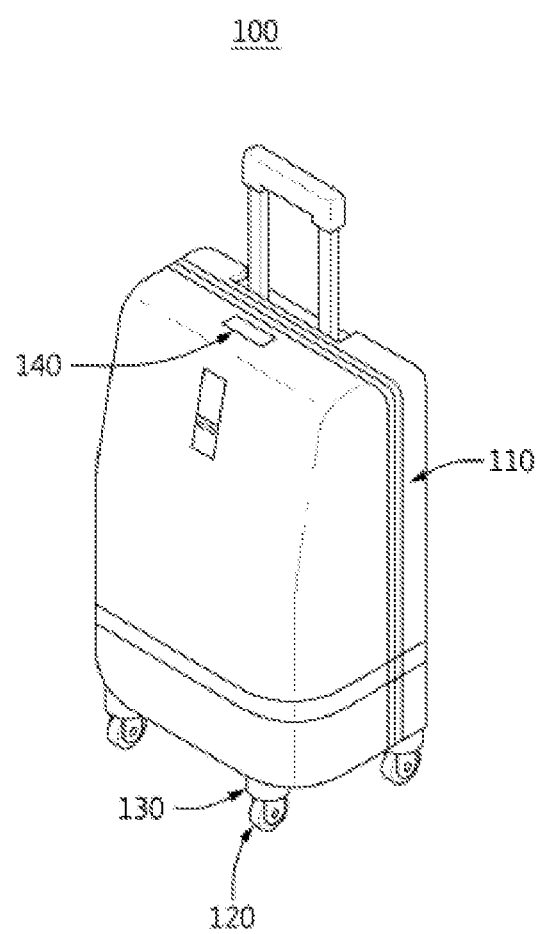

[Fig 2]
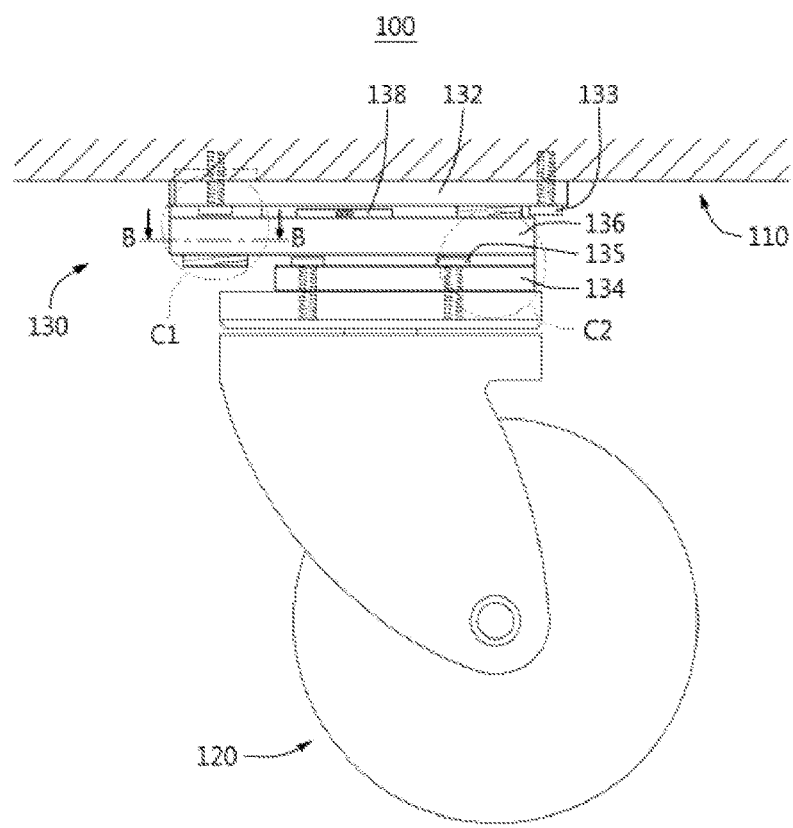

[Fig 3]
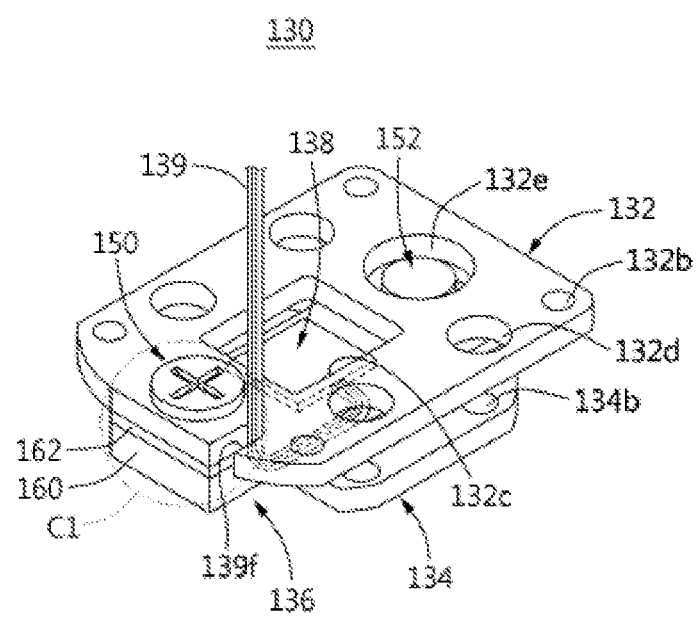

【Fig 4】
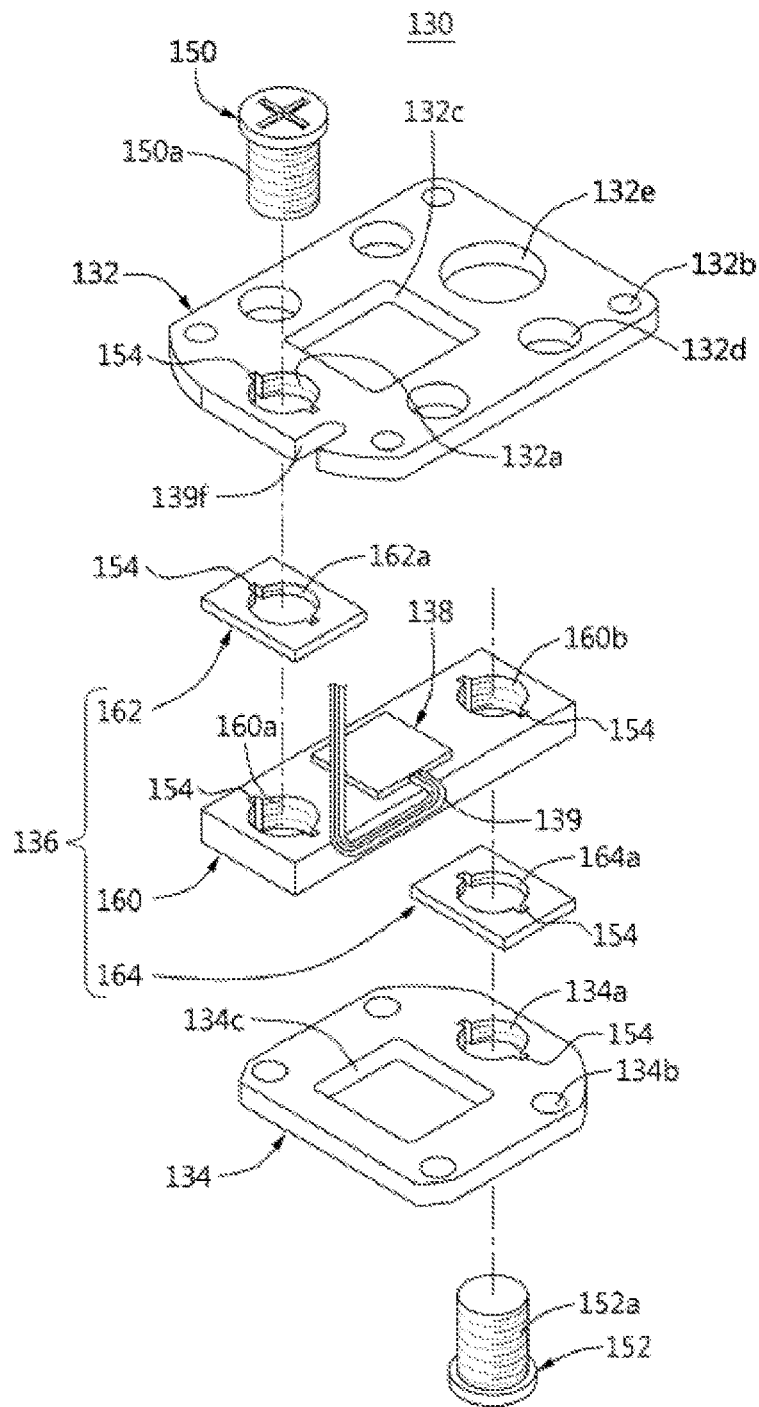

【Fig 5】
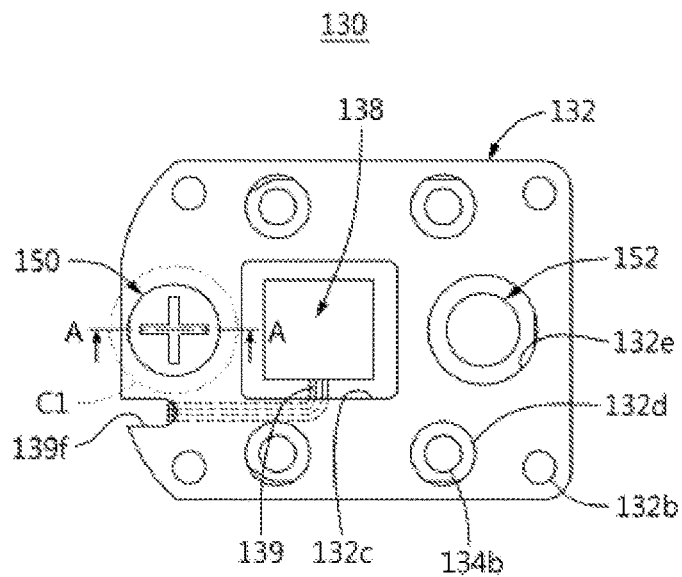
【Fig 6】
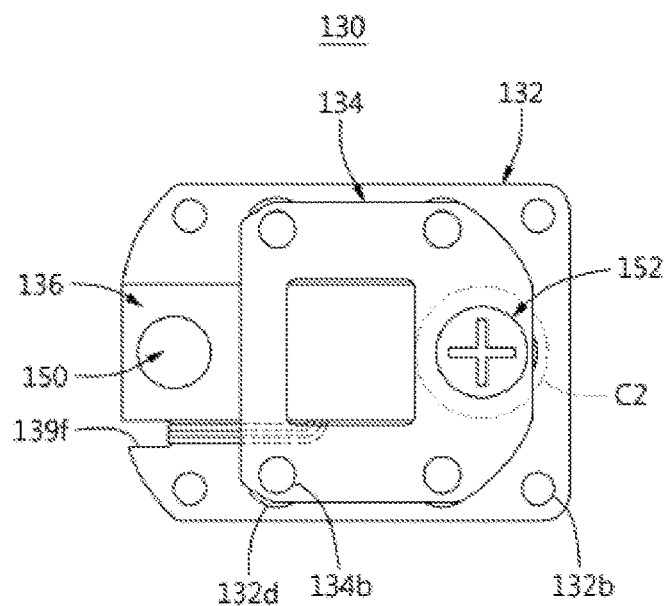

[Fig 7]
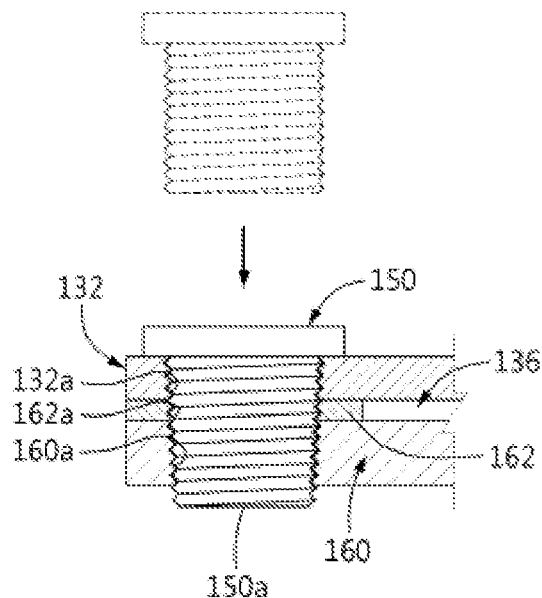
[Fig 8]
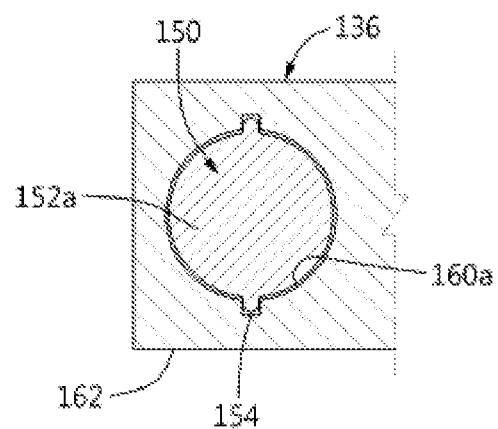

DEVICE FOR WEIGHT MEASUREMENT OF A MOVEABLE ARTICLE

TECHNICAL FIELD

The present invention relates to a weight measurement system, and more particularly, to a weight measurement system capable of measuring the weight of a target measurement object such as a bag, a chair, a bed, a wheelchair, a wagon, or a stroller in real time without a separate scale.

BACKGROUND ART

In general, the weights of products such as bags, chairs, and beds can have significant implications in special situations.

For example, the weight of a bag that can be brought onto an airplane is limited, and a baggage fee is paid if the bag loaded in the cargo hold of the plane exceeds a set weight. In addition, since it is very difficult to measure the weight of a patient lying on a bed of a clinic for a long time using a scale, there is a desperate need for a method of measuring the weight of a patient while the patient is lying on a bed. In addition, if the weight of a person sitting on a chair can be measured in real time, the method may be effectively used for weight management of a student or office worker who sits on a chair for a long time.

As a method of measuring the weight of a bag, a chair, or a bed, the method of directly measuring the weight of a bag, a chair, or a bed using a separate scale is widely used. In particular, it is desirable to measure the total weight of the bag itself and the contents of the bag while the contents are stored in the bag.

In recent years, techniques have been developed to measure the weight of a bag, chair, or bed by installing a scale on a bag, a chair, or a bed. For example, Korean Patent Application Publication No. 2003-0084096 ("Self weightable suitcase", published on Nov. 11, 2003) discloses a technique of installing a scale on a handle of a bag so as to measure the weight of the bag by simply lifting the handle.

However, the technique disclosed in Korean Patent Application Publication No. 2003-0084096 has a difficulty in maintaining the posture for a certain time while the bag is directly lifted, and it is substantially impossible to apply the technique to a chair or a bed.

Therefore, there is an increasing need for a weight measurement system that can easily measure the weights of bags, chairs, beds, etc. in real time without a separate scale device and is simple to apply to various products.

DISCLOSURE

Technical Problem

Therefore, the present invention has been made in view of the above problems, and it is one object of the present invention to provide a weight measurement system capable of quickly measuring the weight of a target measurement object such as a bag, a chair, a bed, a wheelchair, a wagon, or a stroller in real time without a separate scale.

It is another object of the present invention to provide a weight measurement system capable of very easily measuring the weights of target measurement objects without lifting the target measurement objects such as a bag, a chair, a bed, a wheelchair, a wagon, and a stroller.

It is another object of the present invention to provide a weight measurement system capable of improving operational reliability and product life by securely arranging a weight measurement mechanism between a target measurement object and wheels.

Technical Solution

In accordance with one aspect of the present invention, provided is a weight measurement system including a target measurement object for selectively carrying loads of varying sizes, a wheel provided to a lower portion of the target measurement object to move the target measurement object, and a weight measurement mechanism disposed between the wheel and the target measurement object to measure a weight of the target measurement object applied to the wheel.

Here, the weight measurement mechanism may include an upper frame mounted on the lower portion of the target measurement object, a lower frame mounted on an upper portion of the wheel, an elastically deformable body positioned between the upper frame and the lower frame, the elastically deformable body having one end connected to the upper frame and an opposite end connected to the lower end, and a deformation amount detection sensor provided on the elastically deformable body to detect an amount of elastic deformation of the elastically deformable body caused by the weight of the target measurement object. Therefore, by simply disposing the target measurement object such that the wheel and the ground contact each other, the weight of the target measurement object may be measured by the weight measurement mechanism in real time without using a separate scale.

The weight measurement mechanism may further include a press-fit type fastening member fastened to the one end of the elastically deformable body and a first connection portion of the upper frame and connected to the opposite end of the elastically deformable body and a second connection portion of the lower frame. The press-fit type fastening member may be screwed into the first connection portion and the second connection portion in a forced press-fitting manner.

The press-fit type fastening member may be fastened through the first connection portion and the second connection portion. At least one of the upper frame and the lower frame may be provided with an interference avoiding portion for avoiding interference with the press-fit type fastening member.

The press-fit type fastening member may be provided with a bolt portion, and the first connection portion and the second connection portion may be provided with a nut hole portion allowing the bolt portion to be screwed thereinto in a forced press-fitting manner. The nut hole portion may be formed in a shape having a diameter decreasing in an insertion direction of the bolt portion.

A side surface of the nut hole may be provided with an anti-rotation groove for preventing the bolt portion from loosening. The bolt portion may be inserted into the anti-rotation groove with a part thereof deformed when the bolt portion is press-fitted into the nut hole portion.

The press-fit fastening member may be formed of a softer material than the nut hole portion.

The weight measurement system may further include a weight notification mechanism connected to the weight measurement mechanism to communicate a signal to indicate a measured value of the weight measurement mechanism.

The weight notification mechanism may include at least one of a display unit and a speaker unit. The display unit may visually display the measured value of the weight measurement mechanism, and the speaker unit may audibly announce the measured value of the weight measurement mechanism.

The elastically deformable body may include an elastic member disposed between the upper frame and the lower frame and elastically deformed by the weight of the target measurement object, a first gap defining member disposed between one end of the elastic member and the upper frame to define a gap between the elastic member and the upper frame, and a second gap defining member disposed between an opposite end of the elastic member and the lower frame to define a gap between the elastic member and the lower frame.

The first connection portion may be formed at a position where the one end of the elastic member, the upper frame, and the first gap defining member contact each other, and the second connection portion may be formed at a position where the opposite end of the elastic member, the lower frame and the second gap defining member contact each other. Here, the press-fit type fastening member may be fastened through the first connection portion and the second connection portion.

The deformation amount sensor may be attached to at least one of an upper surface and a lower surface of the elastic member. At least one of the upper frame and the lower frame may be provided with a maintenance part for maintenance of the deformation amount detection sensor.

The upper frame may be mounted on the lower portion of the target measurement object using a fastening bolt, and the lower frame may be mounted on the upper portion of the wheel using a fastening bolt. Here, at least one of the upper frame and the lower frame may be provided with a fastening guide portion for fastening of the fastening bolt.

The target measurement object may include one of a bag, a chair, a bed, a wheelchair, a wagon, and a stroller.

Advantageous Effects

According to an embodiment of the present invention, a weight measurement system may quickly measure the weight of a target measurement object in real time using a weight measurement mechanism disposed between the target measurement object and a wheel, even if a separate scale for measuring the weight of the target measurement object is not used.

According to an embodiment of the present invention, a weight measurement system allows a weight measurement mechanism to measure the weight of a target measurement object in the process of transferring the weight of the target measurement object to a wheel via the weight measurement mechanism if the target measurement object is placed on the ground with the wheel and the ground contacting each other. Therefore, the weight of the target measurement object may be measured by simply placing the target measurement object on the ground without any additional work or process for measuring the weight of the target measurement object.

In addition, according to an embodiment of the present invention, a weight measurement system has a structure in which press-fit type fastening members are screwed into connection portions of an upper frame, a lower frame and an elastically deformable body of a weight measurement mechanism in a forced press-fitting manner. Accordingly, the upper frame, lower frame and elastically deformable body may be connected very firmly to improve the operational reliability of the weight measurement mechanism and product life.

Further, in a weight measurement system according to an embodiment of the present invention, since the diameter of the nut hole portion to which the bolt portion of a press-fit type fastening member is fastened is formed to gradually decrease in the fastening direction of the bolt portion, the bolt portion may be forcibly inserted into the nut hole portion while at least one of the bolt portion and the nut hole is deformed in the fastening process. Therefore, the bolt portion and the nut hole portion may be very strongly coupled semi-permanently, and accordingly, arbitrary loosening of the bolt portion and the nut hole may be prevented.

Further, in a weight measurement system according to an embodiment of the present invention, since an anti-rotation groove is formed in a side portion of the nut hole portion to which the bolt portion of the press-fit type fastening member is fastened, a space defined between the bolt portion and the nut hole portion may disappear as a part of the bolt portion is crushed and deformed during fastening of the bolt portion and the nut hole portion, and at the same time, a part of the bolt portion may be inserted into the anti-rotation groove. Therefore, since the bolt portion and the nut hole portion are not arbitrarily rotated in the coupled state, the upper frame, the lower frame, and the elastically deformable body may be prevented from being arbitrarily rotated about the fastening points of the bolt portion and the nut hole portion.

DESCRIPTION OF DRAWINGS

FIG. 1 is a perspective view illustrating a weight measurement system applied to a bag according to an embodiment of the present invention.

FIG. 2 is a side view illustrating the weight measurement system shown in FIG. 1.

FIGS. 3 and 4 are a perspective view and an exploded perspective view illustrating the weight measurement system shown in FIG. 2.

FIGS. 5 and 6 are a plan view and a bottom view illustrating the weight measurement system shown in FIG. 2.

FIG. 7 is a cross-sectional view taken along line A-A shown in FIG. 5.

FIG. 8 is a cross-sectional view taken along line B-B shown in FIG. 2.

BEST MODE

Hereinafter, embodiments of the present invention will be described in detail with reference to the accompanying drawings. However, the present invention is not limited to or limited by the embodiments. Like reference numerals in the drawings denote like elements.

FIG. 1 is a perspective view illustrating a weight measurement system 100 applied to a bag according to an embodiment of the present invention. FIG. 2 is a side view illustrating the weight measurement system 100 shown in FIG. 1, FIGS. 3 and 4 are a perspective view and an exploded perspective view illustrating the weight measurement system 100 shown in FIG. 2, and FIGS. 5 and 6 are a plan view and a bottom view illustrating the weight measurement system 100 shown in FIG. 2. FIG. 7 is a cross-sectional view taken along line A-A of FIG. 5, and FIG. 8 is a cross-sectional view taken along line B-B of FIG. 2.

Referring to FIG. 1, the weight measurement system 100 according to an embodiment of the present invention includes a target measurement object 110, a wheel 120, and a weight measurement mechanism 130.

The target measurement object 110 may be an item onto which loads of various sizes can be selectively loaded. In order to increase the effect of use of the target measurement object 110, accurate measurement of the weight may be required. The wheel 120 is a member for increasing the movement efficiency and transportation efficiency of the target measurement object 110, and may be provided below the target measurement object.

For example, the target measurement object 110 may include any one of a bag, a chair, a bed, a wheelchair, a wagon, and a stroller. The wheel 120 may be disposed at lower corner portions of the bag and may be disposed at lower ends of legs provided to the chair and the bed. In addition, at least one pair of wheels 120 may be disposed on both sides of the wheelchair, the wagon or the stroller. Hereinafter, for simplicity, it is assumed that the target measurement object 110 is a bag and the wheels 120 are disposed at corner portions of the bottom surface of the bag in the present embodiment. However, the target measurement object in this embodiment is not limited to a bag, a chair, a bed, a wheelchair, a wagon, and a stroller. A moving means and a conveying means which have mobility due to wheels provided thereto and require measurement of weight may all be used as target measurement objects.

The weight measurement mechanism 130 is a device to measure the weight of the target measurement object applied to the wheels 120. The weight measurement mechanism 130 may be disposed between the wheels 120 and the target measurement object 110. Thus, the load of the target measurement object 110 is transmitted to the wheels 120 via the weight measurement mechanism 130. In this process, the weight measurement mechanism 130 may measure the weight of the target measurement object in real time.

Referring to FIGS. 1 to 6, the weight measurement mechanism 130 may include an upper frame 132, a lower frame 134, an elastically deformable body 136, and a deformation amount sensor 138.

The upper frame 132 may be mounted at the bottom of the target measurement object 110. The upper frame 132 may be fastened and fixed to the lower portion of the target measurement object 110 with a plurality of first fastening bolts 133. The upper frame 132 may be formed in a metal plate shape and provided with a plurality of first fastening holes 132b allowing the first fastening bolts 133 to be inserted therethrough. Target measurement object fastening holes (not shown) may be formed in the lower portion of the target measurement object 110 at positions corresponding to the first fastening holes 132b in order to allow the first fastening bolts 133 to be fastened to the lower portion.

The lower frame 134 may be mounted on an upper portion of the wheel 120. The lower frame 134 may be fastened to the upper portion of the wheel 120 by a plurality of second fastening bolts 135. The lower frame 134 may be formed in the same metal plate shape as the upper frame 132 and provided with a plurality of second fastening holes 134b allowing the second fastening bolts 135 to be inserted therethrough. In order to fasten the second fastening bolts 135 to the upper portion of the wheel 120, wheel fastening holes (not shown) may be formed in the upper portion at positions corresponding to the second fastening holes 134b.

In this embodiment, the upper frame 132 is mounted on the lower portion of the target measurement object 110 after the lower frame 134 is first mounted on the upper portion of the wheel 120. Here, the upper frame 132 may be formed to extend further in the lateral direction than the lower frame 134. The first fastening holes 132b may be formed in the extension of the upper frame 132. Therefore, it is possible to avoid the interference of the lower frame 134 in fastening of the first fastening bolts 133 to the first fastening holes 132b.

On the other hand, since the lower frame 134 has a smaller area than the upper frame 132, the second fastening bolts 135 may be interfered with by the upper frame 132 when they are fastened to the second fastening holes 134b. To address this issue, a fastening guide portion 132d may be provided to the upper frame 132 to facilitate the operation of fastening the second fastening bolts 135. The fastening guide portion 132d may be formed in a hole shape and arranged at positions corresponding to the second fastening holes 134b in order to avoid interference by the upper frame 132. Therefore, the second fastening bolts 135 may be fastened to the second fastening holes 134b through the fastening guide portion 132d.

In contrast with this embodiment, the upper frame 132 may be first mounted on the lower portion of the target measurement object 110 and then the lower frame 134 may be mounted on the upper portion of the wheels 120, or the upper frame 132 and the lower frame 134 may be mounted on the target measurement object 110 and the wheels 120 at the same time. In this case, the shapes and positions of the upper frame 132, the lower frame 134, and the fastening guide portion 132d may be appropriately changed from the present embodiment.

Meanwhile, the lower frame 134 may be provided with a weight-reduction portion 134c formed in the shape of a groove or a hole. If the weight-reduction portion 134c is provided in the lower frame 134, unnecessary waste of material may be prevented and cost reduction may be realized. Hereinafter, it is assumed in the present embodiment that the weight-reduction portion 134c is formed in a hole shape and provided at the center of the lower frame 134. In particular, the weight-reduction portion 134c may be utilized to avoid a structure formed on the upper portion of the wheel 120 when the lower frame 134 and the wheel 120 are coupled.

Referring to FIGS. 2 to 6, the elastically deformable body 136 is a member that is elastically deformed according to the load of the target measurement object 110. The elastically deformable body 136 may be positioned between the upper frame 132 and the lower frame 134. One end of the elastically deformable body 136 may be connected to the upper frame 132 to form a first connection portion C1 and the other end of the elastically deformable body 136 may be connected to the lower frame 134 to form a second connection portion C2.

For example, the elastically deformable body 136 may include an elastic member 160, a first gap defining member 162, and a second gap defining member 164.

The elastic member 160 is a member that is elastically deformed by the load of the target measurement object 110. The elastic member 160 may be disposed between the upper frame 132 and the lower frame 134. While the elastic member 160 is illustrated in this embodiment as being formed in the shape of a bar, a lever, a beam, or the like, using a metal material having excellent elasticity, embodiments of the present invention are not limited thereto. The elastic member 160 may be manufactured in various structures using various materials.

For example, the elastic member may be compressively disposed in a U shape or arch shape between the upper frame 132 and the lower frame 134 such that the elastic member is elastically folded or unfolded by the load of the target measurement object 110. Alternatively, the elastic member may be disposed in a cylindrical shape between the upper frame 132 and the lower frame 134 such that the elastic member is elastically twisted by the load of the target measurement object 110.

The first gap defining member 162 is a member that defines a gap between the elastic member 160 and the upper frame 132. The first gap defining member 162 may be disposed between one end of the elastic member 160 and the upper frame 132. The first gap defining member 162 may be formed to have a thickness corresponding to the size of the gap.

The second gap defining member 164 is a member that defines a gap between the elastic member 160 and the lower frame 134. The second gap defining member 164 may be disposed between the other end of the elastic member 160 and the lower frame 134. The second gap defining member 164 may be formed to have a thickness corresponding to the size of the gap.

Accordingly, the first connection portion C1 may be formed at a position where one end of the elastic member 160, the upper frame 132 and the first gap defining member 162 contact each other, and the second connection portion C2 may be formed at a position where the other end of the elastic member 160, the lower frame 134, and the second gap defining member 164 contact each other.

Unlike the present embodiment, the first gap defining member 162, the second gap defining member 164, and the elastic member 160 may be integrally manufactured. For example, the first gap defining member 162, the second gap defining member 164, and the elastic member 160 may be formed as an integrated structure through die casting.

Referring to FIGS. 2 to 6, the deformation amount detection sensor 138 serves to detect the amount of elastic deformation of the elastically deformable body 136. The deformation amount detection sensor 138 may be arranged at the elastically deformable body 136. For example, the deformation amount detection sensor 138 may detect the amounts of length change, curvature change, torsional change, and the like of the elastically deformable body 136 when the elastically deformable body 136 is elastically deformed. The measured values of the deformation amount sensor 138 may be used to calculate the load of the target measurement object applied to the elastically deformable body 136.

In the following description, it is assumed that the deformation amount detection sensor 138 is attached to only the upper surface of the elastic member 160 and that the measured values of the deformation amount sensor 138 are transmitted to the outside via a wire 139. A wire guide groove 139f for wiring of the wire 139 may be formed on one side of the upper frame 132.

The deformation amount detection sensor 138 may be attached to at least one part of the upper surface or lower surface of the elastic member 160. At least one of the upper frame 132 and the lower frame 134 may be provided with a maintenance part 132c for maintenance of the deformation amount detection sensor 138. That is, the maintenance part 132c may be formed in a hole shape or a groove shape at a position corresponding to the deformation amount detection sensor 138. Hereinafter, in the present embodiment, it is assumed that the maintenance part 132c is formed only in the upper frame 132 since the deformation amount sensor 138 is attached only to the upper surface of the elastic member 160.

Referring to FIG. 1, the weight measurement mechanism 130 according to the present embodiment may further include a weight notification mechanism 140. The weight notification mechanism 140 is a device for informing the weight measurement mechanism 130 of the measured weight of the target measurement object 110.

For example, the weight notification mechanism 140 may include at least one of a display unit or a speaker unit. The display unit may visually display the measured values of the weight measurement mechanism 130. The display unit may be disposed at a portion of the outer side of the target measurement object 110 with good visibility. The speaker unit may audibly announcer the measured values of the weight measurement mechanism 130. The speaker unit may be placed at the target measurement object 110, facing in a direction in which the speaker unit emits sound from the target measurement object 110 to the user.

The weight notification mechanism 140 may be communicatively connected to the weight measurement mechanism 130. In this embodiment, it is assumed that the weight notification mechanism 140 is provided only with a display unit and is connected to the deformation amount detection sensor 138 of the weight measurement mechanism 130 so as to communicate signals in a wired manner. However, embodiments of the present invention are not limited thereto. The weight notification mechanism 140 may be connected to the weight measurement mechanism 130 so as to communicate signals in a wireless manner.

Referring to FIGS. 2 to 8, the weight measurement mechanism 130 according to the present embodiment may further include press-fit type fastening members 150 and 152. The press-fitting type fastening members 150 and 152 may be screwed into the first connection portion C1 and the second connection portion C2 in a forced press-fitting manner.

For example, the press-fit type fastening members 150 and 152 may include a first press-fit type fastening member 150 and a second press-fit type fastening member 152. The first press-fit type fastening member 150 may be screwed into the first connection portion C1 in a forced press-fitting manner and the second press-fit type fastening member 152 may be screwed into the second connection portion C2 in a forced press-fitting manner.

The press-fit type fastening members 150 and 152 may be fastened through the first connection portion C1 or the second connection portion C2. Therefore, both ends of the press-fit type fastening members 150 and 152 may protrude to the outside of the first connection portion C1 or the second connection portion C2, and thus interfere with the upper frame 132 or the lower frame 134. In order to prevent such interference, the upper frame 132 or the lower frame 134 may be provided with an interference avoiding portion 132e for avoiding interference with the press-fit type fastening members 150, 152. The interference avoiding portion 132e may be formed in either a groove shape or a hole shape. Hereinafter, it is assumed in the present embodiment that the interference avoiding portion 132e is formed only in the upper frame 132. That is, the upper end of the second press-fit type fastening member 152 is disposed on the interference avoiding portion 132e such that interference with the upper frame 132 is avoided. On the other hand, in the present embodiment, the lower frame 134 may be formed to be small as to avoid interference with the lower end of the first press-fit type fastening member 150.

More specifically, the bolt portion 150a and 152a may be formed at one side of the press-fit fastening members 150 and 152 in a protruding manner. The bolt portions 150a and 152a may be formed in the shape of a cylinder having male threads on the outer periphery thereof. The first connection portion C1 may be provided with first nut hole portions 132a, 162a, and 160a into which the first bolt portion 150a of the first press-fit type fastening member 150 is screwed in a forced press-fitting manner. The second connection portion C2 may be provided with second nut hole portions 134a, 164a, and 160b into which the second bolt portion 152a of the second press-fit type fastening member 152 is screwed in a forced press-fitting manner.

Here, the first nut hole portions 132a, 162a, 160a and the second nut hole portions 134a, 164a, 160b may be formed to have a diameter gradually decreasing in the insertion direction of the press-fit type fastening members 150, 152. Accordingly, the first bolt portion 150a and the first nut hole portions 132a, 162a and 160a, or the second bolt portion 152a and the second nut hole portions 134a, 164a and 160b may be crushed and fastened together. Thereby, the first bolt portion 150a and the first nut hole portions 132a, 162a and 160a, or the second bolt portion 152a and the second nut hole portions 134a, 164a and 160b may be very firmly coupled. Hereinafter, in this embodiment, it is assumed that the press-fit fastening members 150 and 152 are formed of a softer material than the first nut holes 132a, 162a, 160a and the second nut holes 134a, 164a, 160b. Accordingly, when the first bolt portion 150a and the first nut hole portions 132a, 162a, 160a or the second bolt portion 152a and the second nut hole portions 134a, 164a, 160b are fastened to each other in a press-fitting manner, only the bolt portions 150a and 152a may be crushed and deformed and thus very firmly fastened to each other as the spaces between the bolt portion and the nut hole portions are eliminated by the deformation of the bolt portions 150a and 152a.

The side surfaces of the first nut holes 132a, 162a, 160a and the second nut holes 134a, 164a may be provided with an anti-rotation groove 154 for preventing the first bolt portion 150a and the second bolt portion 152a from loosening. As the anti-rotation groove 154 is formed, a part of the bolt portions 150a and 152a may be inserted into the anti-rotation groove 154 according to deformation of the bolt portions 150a and 152a when the press-fit type fastening members 150 and 152 are fastened. In this embodiment, it is assumed that the anti-rotation groove 154 is formed in the side surfaces of the first nut holes 132a, 162a, 160a and the second nut holes 134a, 164a, 160b and extends in the insertion direction of the bolts 150a, 152a. However, embodiments of the present invention are not limited thereto. One or more anti-rotation grooves 154 may be formed in various shapes intersecting with the rotation direction of the bolt portions 150a and 152a.

Hereinafter, the assembly process and operation of the weight measurement system 100 according to an embodiment of the present invention will be described.

First, the assembly process of the weight measurement system 100 will be described in detail.

The deformation amount detection sensor 138 is attached to the upper surface of the elastic member 160 of the elastically deformable body 136.

Here, the first connection portion C1 is formed by sequentially stacking one end of the elastic member 160, the first gap defining member 162, and the upper frame 132, and the first bolt portion 150a of the first press-fit type fastening member 150 is fastened to the nut hole portions 132a, 162a, and 160a in a forced press-fitting manner.

Then, the second connection portion C2 is formed by sequentially stacking the lower frame 134, the second gap defining member 164 and the other end of the elastic member 160, and the second bolt portion 152a of the second press-fit type fastening member 152 is fastened to the nut hole portions 134a, 164a, and 160b in a forced press-fitting manner.

When the press-fit fastening members 150 and 152 are fastened as described above, the first bolt portion 150a is crushed to be firmly coupled with the first nut holes 132a, 162a and 160a, and the second bolt portion 152a is crushed to be firmly coupled with the second nut holes 134a, 164a, and 160b. Accordingly, the weight measurement mechanism 130 is assembled by sequentially stacking the upper frame 132, the first gap defining member 162, the elastic member 160, the second gap defining member 164, and the lower frame 130.

Then, the lower frame 134 of the weight measurement mechanism 130 is mounted on the upper portion of the wheels 120 using the second fastening bolts 135, and the upper frame 132 of the weight measurement mechanism 130 is mounted on the target measurement object 110 using the first fastening bolt 133. At this time, the second fastening bolt 135 is fastened through the fastening guide portion 132d of the upper frame 132. The weight measurement mechanism 130 is then mounted on the lower portion of the target measurement object 110 while being connected to the wheel 120.

The weight measurement mechanisms 130 and the wheels 120 are mounted on the four corner portions of the lower portion of the target measurement object 110, and the four weight measurement mechanisms 130 are connected to the weight notification mechanism 140. Thereby, the operation of assembling the weight measurement system 100 is completed.

The operation of the weight measurement system 100 will be described in detail below. When the target measurement object 110 is a bag, the zero point of the measurement mechanism (130) is corrected by slightly lifting the target measurement object and returning the same to an original position thereof. That is, when the target measurement object 110 is lifted, the applied load of the target measurement object 110 is completely removed from the weight measurement mechanism 130, and thus the zero point of the weight measurement mechanism 130 may be reset.

When various items are put in the target measurement object 110 after the zero-point setting of the weight measurement mechanism 130 is completed, the load of the target measurement object 110 gradually increases, and thus the load acting on the weight measurement mechanism 130 and the wheels 120 also increases.

Meanwhile, the first connection portion C1 of the weight measurement mechanism 130 is connected to the lower portion of the target measurement object 110 and the second connection portion C2 of the weight measurement mechanism 130 is connected to the wheel 120. Therefore, the elastic member 160 of the elastically deformable body 136 is cantilevered and elastically deflected. That is, the load of the target measurement object 110 is applied to one end of the elastic member 160 downward and the other end of the elastic member 160 is fixed to the wheel 120.

When the elastic member 160 is elastically deformed by the load of the target measurement object 110, the deformation amount sensor 138 attached to the upper surface of the elastic member 160 detects the deformation amount of the elastic member 160. Then, the measured value of the deformation amount sensor 138 is used to calculate the weight of the target measurement object 110.

When the weight of the target measurement object 110 is measured in real time in the four weight measurement mechanisms 130 as described above, the four measured values are mutually compensated and transmitted to the weight notification mechanism 140, and the weight notification mechanism 140 signals the same to the outside.

Therefore, if the target measurement object 110 is disposed with the wheels 120 and the ground contacting each other, the weight of the target measurement object 110 may be measured by the weight measurement mechanisms 130 in real time without using a separate scale.

Although exemplary embodiments of the present invention have been described based on specific details such as constituents and the accompanying drawings, it is to be understood that the invention is not limited to the disclosed embodiments, and various modifications and changes may be made thereto without departing from the scope of the present invention. Accordingly, the spirit of the present invention should not be construed as being limited to the embodiments described, and the scope of protection sought by the present disclosure should be determined by the appended claims and their equivalents, and all changes coming within the meaning and equivalency range of the appended claims are intended to be embraced therein.

The invention claimed is:

1. A device for weight measurement of a moveable article comprising: a target measurement means for selectively carrying loads of varying sizes; a wheel function means provided to a lower portion of the target measurement means to move the target measurement means; and a weight measurement means disposed between the wheel function means and the target measurement means to measure a weight of the target measurement means applied to the wheel function means, wherein the weight measurement means comprises: an upper frame mounted on the lower portion of the target measurement means; a lower frame mounted on an upper portion of the wheel function means; an elastically deformable body positioned between the upper frame and the lower frame, the elastically deformable body having one end connected to the upper frame and an opposite end connected to the lower end; and a deformation amount detection means provided on the elastically deformable body to detect an amount of elastic deformation of the elastically deformable body caused by the weight of the target measurement means, wherein the weight measurement means comprises: a press-fit type fastening member fastened to the one end of the elastically deformable body and a first connection portion of the upper frame and connected to the opposite end of the elastically deformable body and a second connection portion of the lower frame, wherein the press-fit type fastening member is screwed into the first connection portion and the second connection portion in a forced press-fitting manner, wherein the press-fit type fastening member is fastened through the first connection portion and the second connection portion, wherein a maintenance means for maintenance of the deformation amount detection means forms an opening surrounding the deformation amount detection means.

2. The device for weight measurement of a moveable article according to claim 1, further comprising:
a weight notification mechanism connected to the weight measurement means to communicate a signal to indicate a measured value of the weight measurement means.

3. The device for weight measurement of a moveable article according to claim 2, wherein the weight notification mechanism comprises at least one of a display unit and a speaker unit,
wherein the display unit visually displays the measured value of the weight measurement means, and the speaker unit audibly announces the measured value of the weight measurement means.

4. The device for weight measurement of a moveable article according to claim 1, wherein the upper frame is mounted on the lower portion of the target measurement means using a fastening bolt, and the lower frame is mounted on the upper portion of the wheel function means using a fastening bolt,
wherein at least one of the upper frame and the lower frame is provided with a fastening guide means for fastening of the fastening bolt.

5. The device for weight measurement of a moveable article according to claim 1, wherein the target measurement means comprises one of a bag, a chair, a bed, a wheelchair, a wagon, and a stroller.

6. The device for weight measurement of a moveable article according to claim 1, wherein the press-fit type fastening member is provided with a bolt portion, and the first connection portion and the second connection portion are provided with a nut hole portion allowing the bolt portion to be screwed thereinto in a forced press-fitting manner,
wherein the nut hole portion is formed in a shape having a diameter decreasing in an insertion direction of the bolt portion.

7. The device for weight measurement of a moveable article according to claim 6, wherein a side surface of the nut hole is provided with an anti-rotation groove for preventing the bolt portion from loosening,
wherein the bolt portion is inserted into the anti-rotation groove with a part thereof deformed when the bolt portion is press-fitted into the nut hole portion.

8. The device for weight measurement of a moveable article according to claim 6, wherein the press-fit fastening member is formed of a softer material than the nut hole portion.

9. The device for weight measurement of a moveable article according to claim 1, wherein the elastically deformable body comprises:
an elastic member disposed between the upper frame and the lower frame and elastically deformed by the weight of the target measurement means;
a first gap defining member disposed between one end of the elastic member and the upper frame to define a gap between the elastic member and the upper frame; and
a second gap defining member disposed between an opposite end of the elastic member and the lower frame to define a gap between the elastic member and the lower frame.

10. The device for weight measurement of a moveable article according to claim 9, wherein the first connection portion is formed at a position where the one end of the elastic member, the upper frame, and the first gap defining member contact each other, and the second connection portion is formed at a position where the opposite end of the elastic member, the lower frame and the second gap defining member contact each other,
wherein the press-fit type fastening member is fastened through the first connection portion and the second connection portion.

11. The device for weight measurement of a moveable article according to claim 9, wherein the deformation amount means is attached to at least one of an upper surface and a lower surface of the elastic member, wherein at least one of the upper frame and the lower frame is provided with the maintenance means for maintenance of the deformation amount detection means.

* * * * *